United States Patent [19]
Jansen

[11] Patent Number: 6,073,777
[45] Date of Patent: Jun. 13, 2000

[54] SAND RESISTANT FLUID SWIVEL

[75] Inventor: Martin Jansen, Agonna Hills, Calif.

[73] Assignee: Imodco Inc., Houston, Tex.

[21] Appl. No.: 09/290,082

[22] Filed: Apr. 12, 1999

Related U.S. Application Data

[60] Provisional application No. 60/082,445, Apr. 20, 1998.
[51] Int. Cl.[7] .......................... F16L 17/035; F16L 27/087; F16L 55/24; B01D 35/02; B01D 33/06; B01D 33/70; E21B 43/013
[52] U.S. Cl. ...................... 210/460; 166/105.4; 277/419; 285/13; 285/98; 285/272; 285/281
[58] Field of Search ..................................... 210/460, 303, 210/463, 299, 310, 320, 459, 450; 166/105.1, 105.4, 105, 105.3, 236; 277/411, 412, 419; 285/98, 190, 280, 281, 278, 13, 133.21, 272, 282, 913

[56] References Cited

U.S. PATENT DOCUMENTS 3,329,449  7/1967  Herold et al. .
4,819,966  4/1989  Gibb .
4,925,219  5/1990  Pollack et al. .
5,242,198  9/1993  Pollack .
5,411,298  5/1995  Pollack .

*Primary Examiner*—W. L. Walker
*Assistant Examiner*—Aaron L. Schwartz
*Attorney, Agent, or Firm*—Freilich Hornbaker & Rosen

[57]  ABSTRACT

A fluid swivel of the type that includes a transfer chamber (56) formed between inner and outer main parts (52, 54), is constructed so sand and other particles settling out of the fluid, does not find its way into the lower gap passage (86) and quickly wear out a seal. A second of the main parts has a lower wall with a raised barrier (110) close to the top (122) of the lower gap passage. The first main part lower wall forms a first barrier (112) in the form of a projection that lies closely over the second barrier. The two barriers are closely spaced to form an entrance region (120) leading to the lower gap passage, with the entrance region including an upstream entrance part (132) that extends vertically or at an upward incline to discourage the migration of sand therealong.

7 Claims, 4 Drawing Sheets

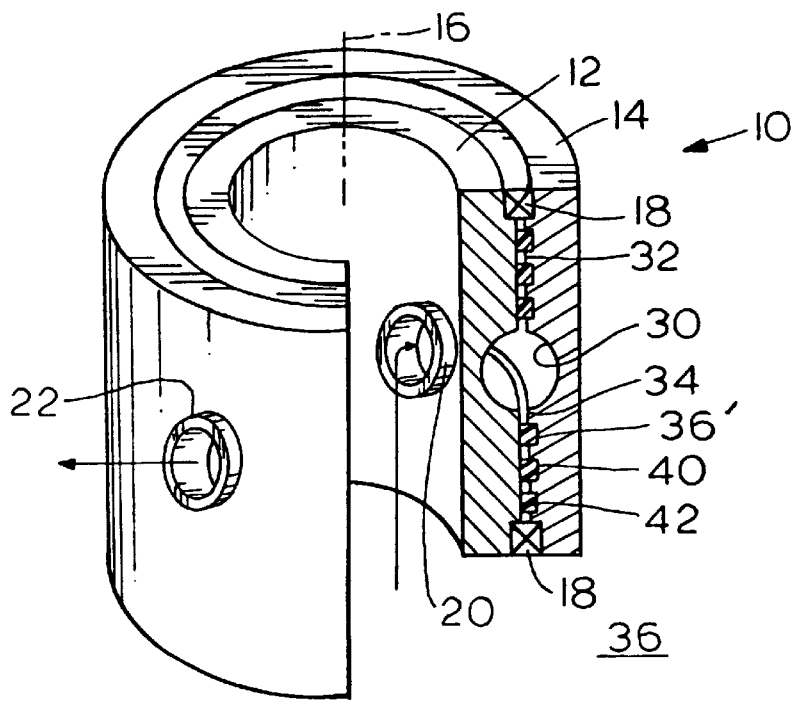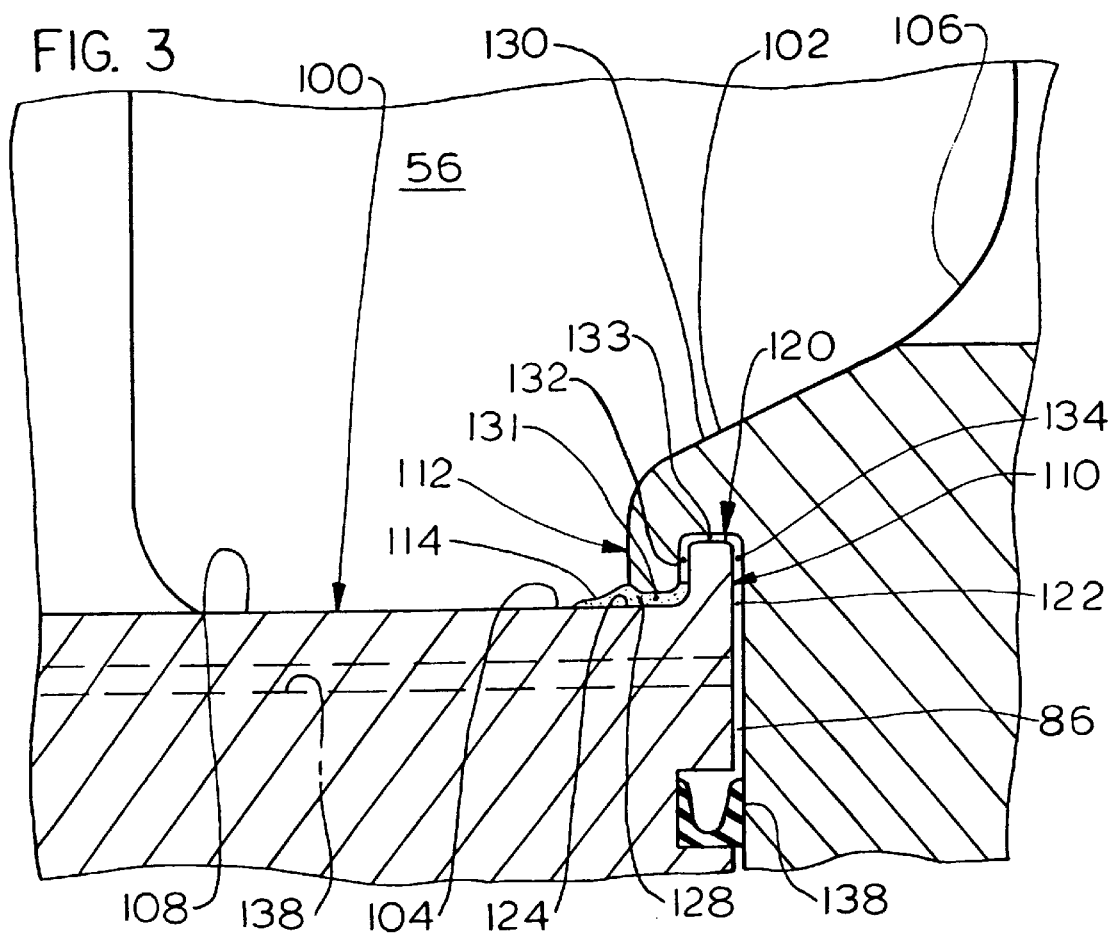

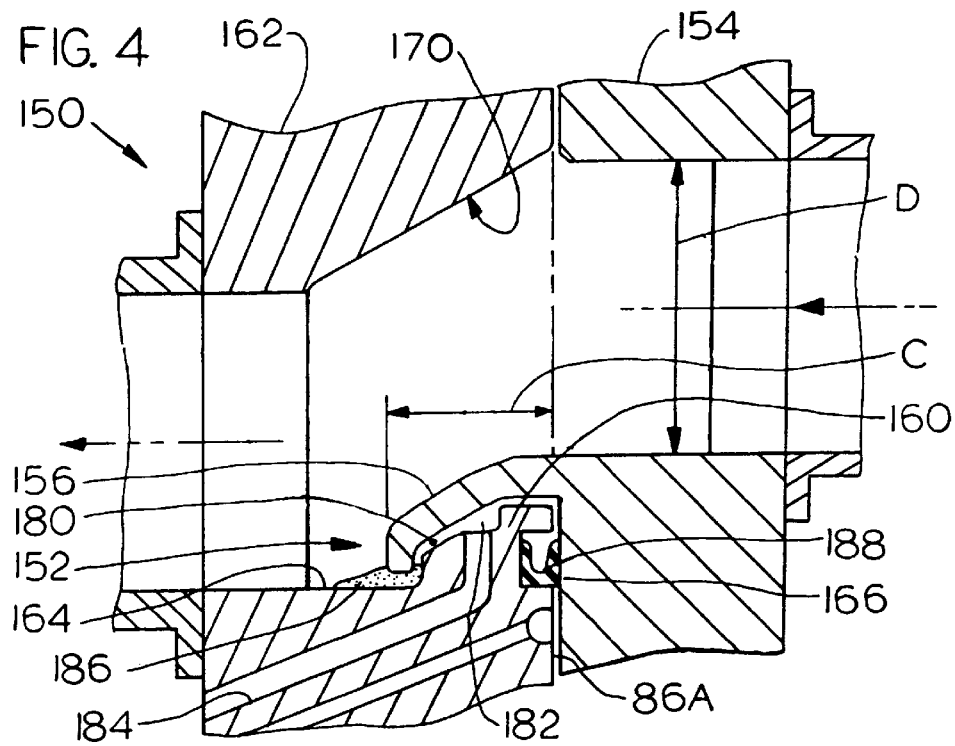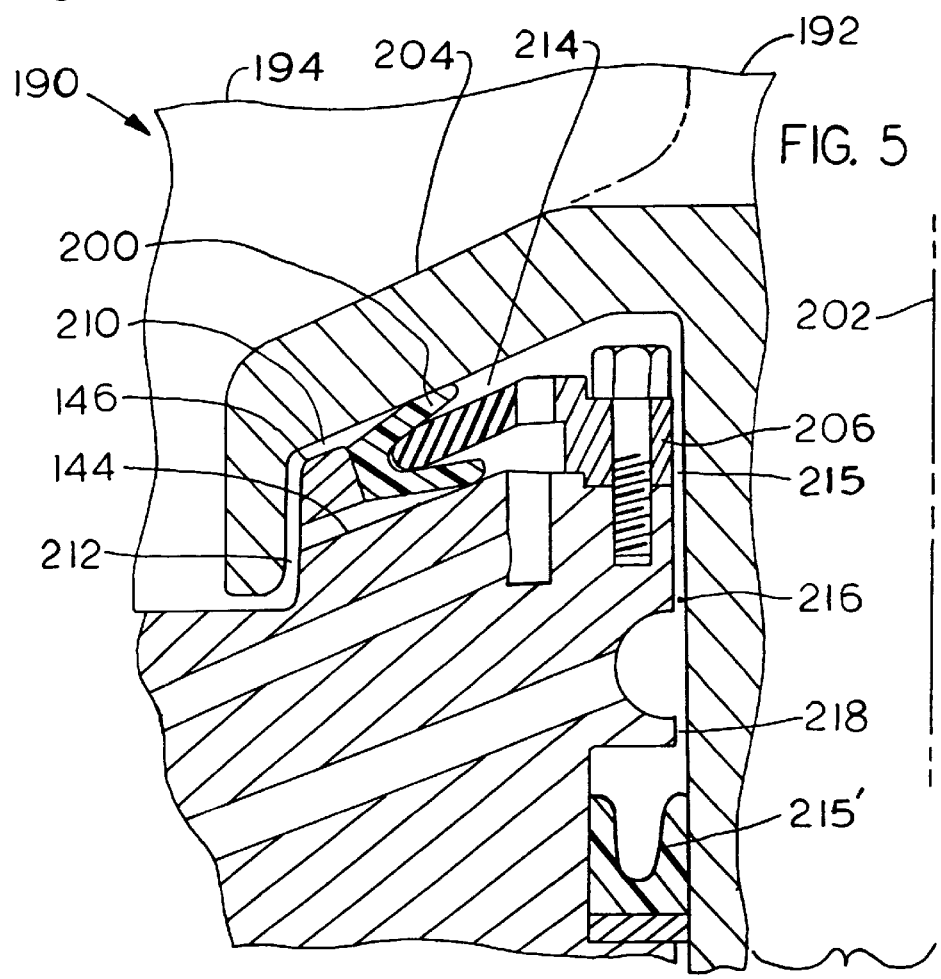

SAND RESISTANT FLUID SWIVEL

CROSS-REFERENCE

Applicant claims the benefit of U.S. Provisional Application Ser. No. 60/082,445 filed Apr. 20, 1998.

BACKGROUND OF THE INVENTION

This invention relates to fluid swivels for an offshore hydrocarbon production or transfer system.

Fluid swivels are commonly used to pass oil, natural gas and other fluids between an undersea well or pipeline, and a weathervaning ship. Such a fluid swivel commonly includes inner and outer main parts, where one part can rotate about a vertical axis without limit relative to the other part as the ship weathervanes. The main swivel parts form an annular transfer chamber between them through which fluid passes, with upper and lower gap passages extending from the transfer chamber to the environment, and with seals along the gap passages.

Fluid passing through the fluid swivel often contains some sand, which can settle out of the fluid and which tends to migrate into the lower gap passage. Such sand is highly abrasive, and tends to greatly reduce the life of seals located along the lower gap passage. A fluid swivel which minimized the migration of sand into the lower gap passage, would increase the life of seals lying along the lower gap passage.

SUMMARY OF THE INVENTION

In accordance with one embodiment of the present invention, a fluid swivel is provided, of the type that includes a transfer chamber between inner and outer main swivel parts, where the lower walls of the transfer chamber are formed to minimize the migration of sand and other particles down along the lower gap passage. Each of the main parts has a transfer chamber lower wall with a proximal portion lying adjacent to the other main part, and with a distal portion lying furthest from the other main part. A second of the main parts has a proximal portion that forms an upstanding second barrier lying close to the top of the lower gap passage, to resist the migration of sand into the lower gap passage.

The proximal portion of the first main swivel part forms a first barrier that projects to lie over the second barrier, to form a narrow entrance region between them leading to the lower gap passage. The entrance region extends upwardly or in an upward incline towards the lower gap passage.

The first barrier that projects to lie over the second barrier, preferably extends at a downward incline and overhangs the second main part lower wall to streamline fluid flow. The first barrier preferably overhangs the second main part by less than ⅟₁₀th the height of the transfer chamber, to streamline flow and facilitate assembly of the swivel.

The novel features of the invention are set forth with particularity in the appended claims. The invention will be best understood from the following description when read in conjunction with the accompanying drawings.

BRIEF DESCRIPTION OF THE DRAWINGS

FIG. 1 is a partially sectional isometric view of a fluid swivel of a fluid swivel of the prior art.

FIG. 3 is a sectional view of a portion of the fluid swivel of FIG. 2.

FIG. 4 is a sectional view of a portion of a fluid swivel constructed in accordance with another embodiment of the invention.

FIG. 5 is a sectional view of a portion of a fluid swivel of another embodiment of the invention.

DESCRIPTION OF THE PREFERRED EMBODIMENTS

Figure 2:
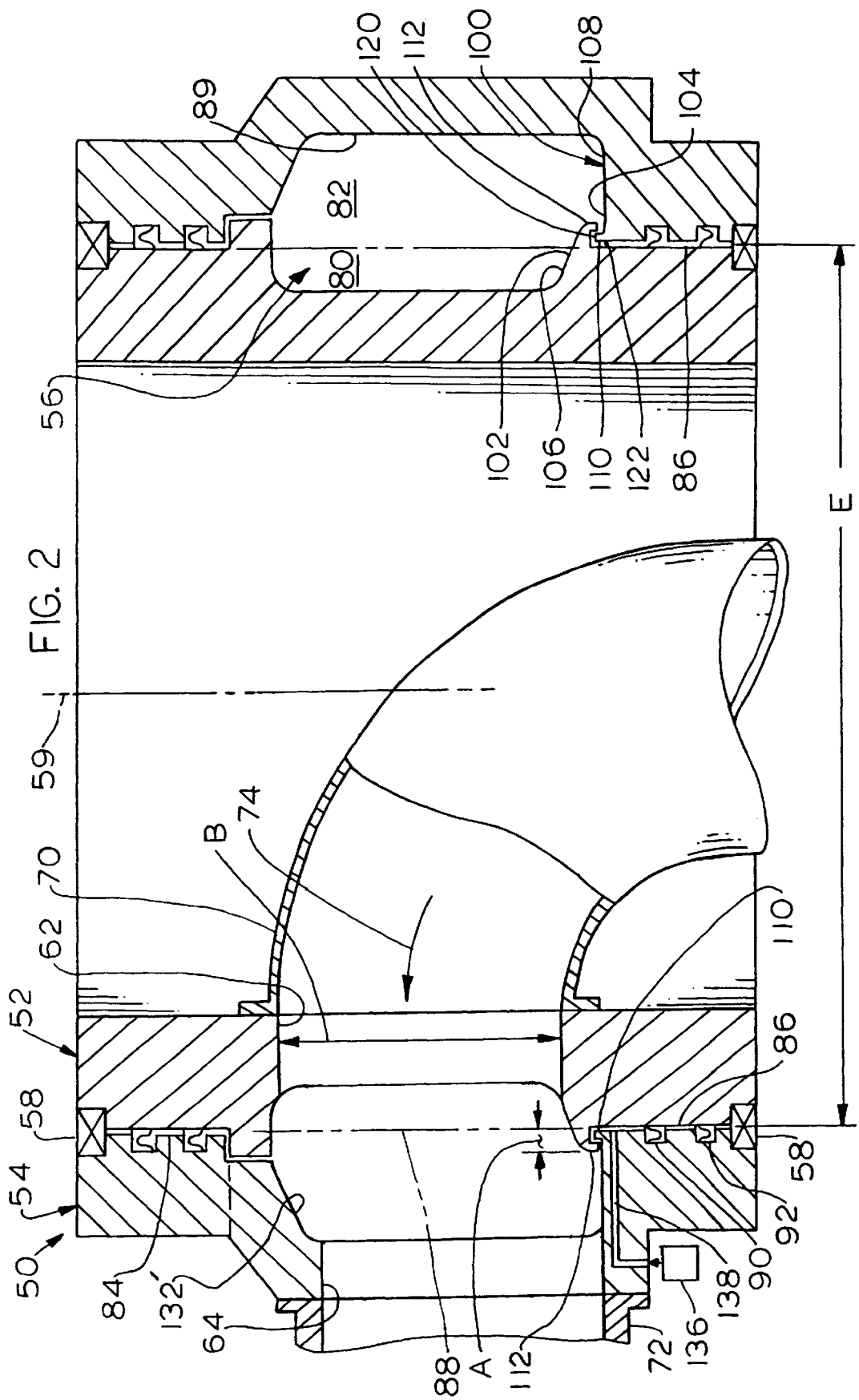
FIG. 2 is a sectional view of a fluid swivel of the present invention.

FIG. 1 shows a prior art fluid swivel 10 which includes inner and outer main swivel parts 12, 14, where the outer part 14 can rotate about a primarily vertical axis 16 about the inner part on one or more bearings 18. The inner part 12 may be connected through an inlet pipe 20 that carries fluid up from the sea floor. The inner part is mounted on a turret or other structure that is anchored to the sea floor and that cannot rotate about a vertical axis by more than a limited amount such as 150. The outer part has an outlet pipe 22 that may be connected to a vessel hull that can weathervane, or rotate without limit about the common vertical axis, around the inner part. The inner and outer swivel parts each form about half of an annular transfer chamber 30 that carries fluid from the inlet pipe 20 around to the outlet pipe 22. There are upper and lower gap passages 32, 34 extending from the transfer chamber 30 respectively upward and downward to the environment 36. Seals are located along each gap passage to prevent the escape of pressured fluid lying in the transfer chamber. For example, along the lower gap passage 34 there is an isolation seal 36' and primary and secondary pressure seals 40, 42.

A common well affluent includes sand and other particles in a fluid stream at a pressure of hundreds of psi. Sand and other debris is more dense than oil or gas, and settles by gravity onto the bottom of the transfer chamber 30. A problem with the settling sand is that it finds its way down to the first seal along the lower gap passage such as seal 36'. Since sand and other particles are abrasive, particles that find their way to the seal 36' tend to rapidly wear it out, necessitating replacement of the seal. The chamber 30, shown in FIG. 1, actually acts like a funnel that directs settling sand into the lower gap passage. It would be desirable if a change in swivel construction would minimize the migration of sand into the lower gap passage.

FIG. 2 is a simplified view of a fluid swivel 50 of the present invention, which includes inner and outer main swivel parts 52, 54 that form an annular transfer chamber 56 between them. Bearings 58 allow the outer swivel part to rotate about a largely vertical axis 59 (which tilts when the vessel tilts) around the inner swivel part. Inlet and outlet ports 62, 64 that open to the transfer chamber, are connected respectively to inlet and outlet pipes 70, 72. Fluid passes along the direction of arrow 74 from the inlet pipe 70, and through the transfer chamber 56 by flowing through the first and second or inner and outer transfer chamber parts 80, 82, to flow out through the outlet pipe 72. As in the case of other swivels, the fluid swivel has upper and lower gap passages 84, 86 leading to the environment. Along the gap passages, the inner and outer main swivel parts lie close but slightly separated, with seals located along each passage. An imaginary line 88 extending between the average horizontal positions of the upper and lower gap passages divides the transfer chamber into its inner and outer parts 80, 82. A chamber outer wall 89 lies along the entire circumference of the chamber except at the outlet port 64.

In accordance with the present invention, applicant constructs the fluid swivel to prevent or minimize the passage of settling sand and other particles along the lower gap passage 86 to avoid such particles reaching seals 90, 92 along the lower gap passage. It is noted that the seal 92 is a pressure seal that can withstand a large pressure difference between its opposite sides that are exposed respectively to the pressure of fluid in the transfer chamber and to atmospheric pressure in the environment. The other seal 90 is an isolation seal which can maintain clean oil between it and the pressure seal.

The lower walls 100 of the transfer chamber includes proximal parts 102, 104 of the inner and outer swivel parts 52, 54, with the proximal parts lying close to the top 122 of the lower gap passage 86. The lower walls also include distal parts 106, 108 which lie furthest from the top of the lower gap passage. Applicant forms the proximal part 104 of the outer or second main swivel part with a second barrier 110 that is raised above a surrounding area of the second swivel part lower wall. Applicant also forms the first main swivel part with a first barrier 112 that extends over the second barrier 110.

FIG. 3 shows details of the barriers 110, 112 that resist the migration of settled particles 114 such as sand into the lower gap passage 86. The upper surface 130 of the barrier 112 extends at an incline to the horizontal. The two barriers 110, 112 form an entrance region 120 leading to the top 122 of the primarily vertical lower gap passage 86. The top 122 can be assumed to be the point where the lower gap passage is at the same level as the lowest location 124 on the proximal part 104 of the lower walls 100 of the transfer chamber. The entrance region 120 is narrow, and includes four sections 131–134 that lead from the transfer chamber 56 to the top of the lower gap passage 86. The initial section 131 extends horizontally from a chamber end 128 of the entrance region, the first section 132 extends vertically or upward, the second section 133 extends horizontally, and the third section 134 extends downwardly through a seal 138'. It is the first section 132 that extends vertically upward in a direction towards the lower gap passage 86, that provides the maximum impediment to sand migration into the lower gap passage. This is because the sand, which is more dense than the surrounding fluid such as oil (hydrocarbons) and gas tends to remain at the bottom of the second section 132. There is substantially no fluid flow along the entrance region 120, so very little sand will move along the lower gap passage. Sand that settles on the portions 104,108, tends to be swept away to flow with fluid moving through the fluid swivel.

FIG. 2 shows that the transfer chamber first part 80 lies at an average level that is higher than that of the second transfer chamber part 82. This results in a "downward cascade" of fluid through the transfer chamber. The first barrier 112 has an upper surface 130 (FIG. 3) which extends at a downward angle along the direction of fluid flow 74 (FIG. 2) through the fluid swivel. In addition, the upper wall 132' of the second transfer chamber part extends at a downward incline along the direction of fluid flow 74 through the swivel. This construction results in the barriers 110, 112 creating only a small restriction in the flow of fluid through the fluid swivel, and in the avoidance of shoulders at the lower walls of the fluid swivel onto which solid particles might accumulate, resulting in a streamlined flow through the fluid swivel. The transfer chamber and ports both have a minimum height B.

Despite the barriers, some settled particles could accumulate in the entrance region 120. Such accumulated particles can be flushed out by a source 136 that pumps fluid through a flush passage 138 that connects to an upper part of the lower gap passage (or the entrance region), to flow from the top of the lower gap passage through the entrance region 120 into the transfer chamber 56. Where a liquid hydrocarbon is being transferred, the flushout fluid may be a clean oil. In this case, the barriers 110, 112 not only keep out particles but keep clean oil in the lower gap passage.

It should be noted that in most all cases the inner main swivel part is prevented from rotation by more than on the order of magnitude of 20°, while the outer swivel part is able to rotate without limit about the inner one. The axis of rotation is nominally vertical, although a vessel can tilt and cause corresponding tilt of the axis 59 away from the vertical. In most cases, the flow is into the inner fluid swivel part and out of the outer fluid swivel part, although some fluid swivels can be constructed for a reverse flow. If there is a reverse flow (flow from the outer swivel part into the inner swivel part) then the barriers should be reversed.

FIG. 4 shows a fluid swivel 150 with a modified barrier arrangement 152. The inner main swivel part 154 of the fluid swivel has a first barrier 156 that projects over a second barrier 160 of the second main swivel part 162. The second barrier 160 is raised above an adjacent downstream location 164, while the first barrier 156 extends at a downward incline over the second barrier. One difference between the construction of FIG. 4 and that of FIGS. 2 and 3, is that the radial length C of the first barrier beyond a location directly over the top 166 of the lower gap passage 86A, is about one half the height D of the transfer chamber 170 at its input and output ends. The smaller overhang A helps in assembling the swivel of FIGS. 2 and 3.

The fluid swivel of FIG. 4 forms an entrance region 180 with an inclined part that is inclined at about 30° to the horizontal. An enlarged annular region 182 enables cleanout fluid pumped in through a cleanout passage 184, to be distributed around the fluid swivel to flush out sand indicated at 186. It is noted that an isolation seal 188 lies along the top 166 of the lower gap passage and the adjacent end of the entrance region 180. The pressure seal (not shown) lies below the top of the lower gap passage.

FIG. 5 shows another fluid swivel 190 with inner and outer main swivel parts 192, 194. In the fluid swivel 190, a seal 200 is provided that presses at an angle to the axis 202 of the swivel, instead of pressing radially. First and second barriers 204, 206 provide an entrance region 210 with a vertical part 212, an inclined part 214 and another vertical part 215 leading to the top 216 of the lower gap passage 218. The seal 200 along the inclined part 214 of the entrance region (which is prior to the isolation seal 215') further prevents migration of sand into the lower gap passage. The ability to select any of different seal mounting arrangements and different inclination angles 214, allows the fluid swivel designer to accomplish design goals such as sealability and sand settlement resistance.

Figure 6:
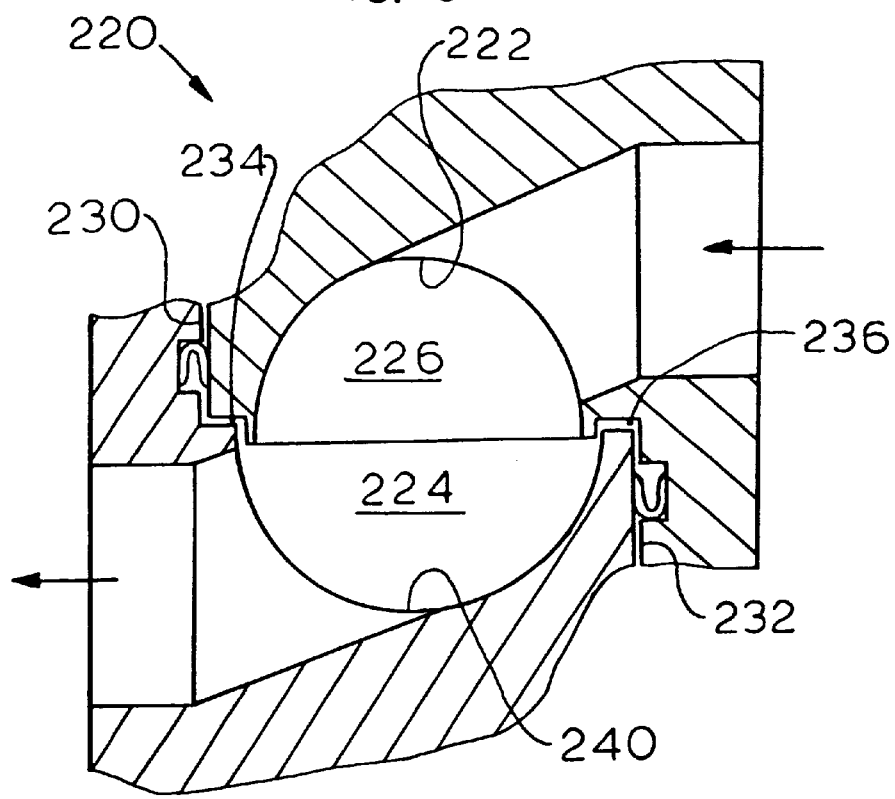
FIG. 6 is a sectional view of a fluid swivel constructed in accordance with another embodiment of the invention.

FIG. 6 illustrates a portion of a fluid swivel 220 with the transfer chamber 222 formed so one half 224 lies directly below the other half 226. As a result, entrance regions 234, 236 for upper and lower gap passages 230, 232 each initially extends from locations that are above the bottom 240 of the transfer chamber where any sand would settle, but would be swept along by fluid flow. The placement of the entrance region and location 236 of the lower gap passage 232, greatly minimizes the amount of sand that would migrate into the passage 232.

Figure 7:
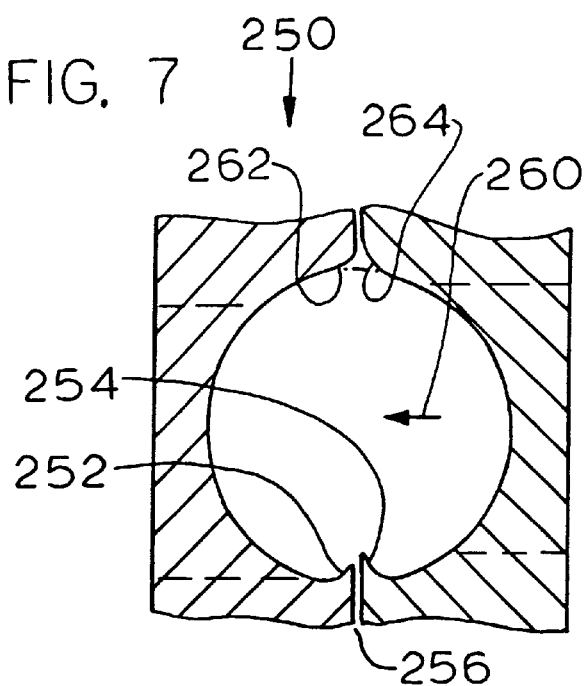
FIG. 7 is a sectional view of a fluid swivel constructed in accordance with another embodiment of the invention.

FIG. 7 illustrates a portion of a fluid swivel 250 that is similar to that of the prior art shown in FIG. 1, but with inclined sections or barriers at 252, 254 at the entrance to the lower gap passage 256. With flow in the direction 260, the inclined barrier 254 preferably extends slightly higher than the barrier 252. The top of the annular transfer chamber is raised at 262 and 264. This arrangement is less effective than the other embodiments of the invention, but is very simple. Sand settling out of the fluid tends to accumulate at the bottom of the inclined barriers so much less of it passes down along the lower gap passage 256, before such settled sand is swept away.

Thus, the invention provides a fluid swivel of the type that includes an annular transfer chamber formed between inner and outer main swivel parts and with a lower gap passage extending from the transfer chamber to the environment and with at least one seal therealong with a configuration that provides a barrier to minimize the migration of settled-out sand and other particles into the lower gap passage. A second one of the main swivel parts has a second barrier lying radially close to the top of the lower gap passage, the barrier being raised so sand tends to settle on a side of the barrier opposite the lower gap passage. The first fluid swivel part has a first barrier that lies over the second barrier to form a narrow entrance region between them, the entrance section having a part that is upwardly inclined (by at least 10°) and that may extend vertically, to resist the migration of sand therealong towards the lower gap passage. The first barrier preferably extends over the second barrier by less than ⅕th and preferably not more than ⅒th the maximum height of the transfer chamber, to ensure a streamlined flow of fluid through the fluid swivel, and to facilitate assembly of the fluid swivel.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A fluid swivel for transferring hydrocarbons that may contain sand or other particles, and which lies in an environment, comprising inner and outer main swivel parts that each have ports, and a bearing that supports said swivel parts in rotation of one of them with respect to the other about a largely vertical axis, said swivel parts including first and second swivel parts forming a transfer chamber positioned radially between them, said transfer chamber having an inlet port and an outlet port through which a fluid with a suspended particles flows between said ports from said first swivel part to said second swivel part, with said first and second swivel parts forming first and second chamber parts that are primarily horizontally spaced and that together form said transfer chamber, and said swivel parts forming a pair of gap passages between them leading from a location near said transfer chamber to the environment including a lower gap passage extending generally downward from near said transfer chamber to the environment with said lower gap passage having at least one seal and having an upper end;

each of said swivel parts has a transfer chamber lower wall with a proximal portion lying adjacent to the other swivel part and a distal portion lying furthest from the other swivel part;

said second swivel part lower wall proximal portion forms a raised second barrier to urge settling particles away from said lower gap passage, and said first swivel part lower wall proximal portion forms a first barrier that lies above said second barrier to divert fluid moving from said first chamber part to said second chamber part, over and past said second barrier.

2. The fluid swivel described in claim 1 wherein:

said first and second swivel parts form first and second transfer chamber parts;

said first barrier projects at least partially radially into the transfer chamber part of said second swivel part.

3. The fluid swivel described in claim 1 wherein:

said first barrier extends at a downward incline and has a largely radial projection that lies over said second barrier.

4. The fluid swivel described in claim 3 wherein:

said second barrier and said largely radial projection of said first barrier have adjacent surfaces that form an entrance region with said lower gap passage upper end connected to said entrance region, with said entrance region including a first entrance part extending at an upward angle toward said lower gap passage, of at least 10° from the horizontal, when said axis is vertical, and said entrance region having a second entrance part extending primarily from said first entrance part to said lower gap passage upper end.

5. In a fluid swivel for transferring hydrocarbons that may contain sand or other particles, and which lies in an environment, said fluid swivel comprising inner and outer main parts and a bearing that supports said main parts in relative pivoting about a primarily vertical axis, where said main parts each forms a port and said main parts form a transfer chamber positioned radially between them that is connected to said ports, with each main part forming a portion of said transfer chamber and with said portions of said transfer chamber being primarily horizontally spaced and having lower walls, and said main parts form a lower gap passage between them, that extends from near said transfer chamber to the environment, where said lower gap passage has an uppermost pressure seal and extends primarily upwardly from said uppermost pressure seal;

said fluid swivel lower walls forming a lower gap passage entrance region with an end that opens to said transfer chamber, with a first entrance region part that extends upwardly and away from a bottom of said transfer chamber at an incline of at least 10° to the horizontal, and a second entrance region part that connects said first entrance region part to said lower gap passage.

6. The fluid swivel described in claim 5, wherein:

said outer main part has an upstanding barrier lying adjacent to said lower gap passage, and said inner main part has a largely radially-outwardly extending projection that extends above said barrier, with at least said first entrance region part formed between said barrier and said projection.

7. The fluid swivel described in claim 6 wherein:

said inner and outer transfer chamber portions each has distal lower wall parts horizontally spaced from said lower gap passage, with said outer transfer chamber portion distal lower wall part lying below said inner transfer chamber portion distal wall, with said projection of said inner main part having an upper surface extending at a radially outward and downward incline, and with at least part of the upper wall of the outer transfer chamber portion extending at a downward and radially outward incline.

* * * * *